United States Patent
Layson, Jr.

(10) Patent No.: US 10,082,568 B1
(45) Date of Patent: Sep. 25, 2018

(54) DETAILED DESCRIPTION

(71) Applicant: Hoyt Mac Layson, Jr., Orlando, FL (US)

(72) Inventor: Hoyt Mac Layson, Jr., Orlando, FL (US)

(*) Notice: Subject to any disclaimer, the term of this patent is extended or adjusted under 35 U.S.C. 154(b) by 890 days.

(21) Appl. No.: 13/999,141

(22) Filed: Jan. 21, 2014

Related U.S. Application Data

(60) Provisional application No. 61/849,190, filed on Jan. 22, 2013.

(51) Int. Cl.
*G01S 13/74* (2006.01)
*G01S 13/75* (2006.01)
*H04W 4/20* (2018.01)

(52) U.S. Cl.
CPC ............ *G01S 13/74* (2013.01); *G01S 13/75* (2013.01); *G01S 13/751* (2013.01); *H04M 2242/04* (2013.01); *H04M 2242/30* (2013.01); *H04W 4/20* (2013.01)

(58) Field of Classification Search
CPC ..... H04W 4/22; H04W 64/00–64/006; H04W 76/007; H04M 3/42357; H04M 2242/30; H04M 2242/04; H04B 7/00; G01S 13/74; G01S 5/0231; G01S 2205/006
USPC ...................................................... 342/25 R
See application file for complete search history.

(56) References Cited

U.S. PATENT DOCUMENTS

| | | | | |
|---|---|---|---|---|
| 5,130,713 | A * | 7/1992 | Wagner | G01S 13/865 342/45 |
| 5,172,110 | A * | 12/1992 | Tiefengraber | G07C 9/00111 340/539.1 |
| 5,485,163 | A * | 1/1996 | Singer | G01S 5/0054 340/7.27 |
| 5,594,425 | A * | 1/1997 | Ladner | B60R 25/102 340/539.13 |
| 5,929,777 | A * | 7/1999 | Reynolds | G01S 1/70 250/339.14 |
| 5,959,533 | A * | 9/1999 | Layson, Jr. | G07C 9/00111 340/539.1 |
| 6,141,558 | A * | 10/2000 | Chen | G01S 3/58 455/440 |
| 6,314,281 | B1 * | 11/2001 | Chao | G01S 1/68 455/404.2 |
| 6,347,229 | B1 * | 2/2002 | Zelmanovich | G01S 1/026 455/456.1 |
| 6,490,455 | B1 * | 12/2002 | Park | H04K 3/45 370/342 |
| 6,934,548 | B1 * | 8/2005 | Gould | G01S 5/04 342/357.31 |
| 8,049,617 | B2 * | 11/2011 | Culpepper | B60R 25/102 340/539.1 |
| 8,183,999 | B1 * | 5/2012 | Giallorenzi | G08B 21/0266 340/539.13 |

(Continued)

*Primary Examiner* — Peter M Bythrow

(57) ABSTRACT

The invention disclosed relates to the end to end system, the methods and an apparatus for locating cell phones, lone workers, assets, and workers in hazardous environments outdoors and indoors. The end to end system integrates with the current E-911 architecture and also provides a stand alone capability for geo-locating workers and assets. The end to end system also provides caller id and geo-spatial location to the E-911 PSAP in the absence of a cellular signal for a cell phone attempting a 911 call.

18 Claims, 1 Drawing Sheet

(56) References Cited

U.S. PATENT DOCUMENTS

| | | | | |
|---|---|---|---|---|
| 8,830,065 B1* | 9/2014 | Stanford | | G06K 7/0008 340/10.1 |
| 2001/0022558 A1* | 9/2001 | Karr, Jr. | | G01S 1/026 342/450 |
| 2001/0026240 A1* | 10/2001 | Neher | | G01S 5/0018 342/357.75 |
| 2002/0183073 A1* | 12/2002 | Morgand | | G01S 5/12 455/456.1 |
| 2003/0146871 A1* | 8/2003 | Karr | | G01S 1/026 342/457 |
| 2004/0029558 A1* | 2/2004 | Liu | | G01S 5/02 455/404.2 |
| 2004/0087317 A1* | 5/2004 | Caci | | G01S 5/021 455/456.1 |
| 2004/0192346 A1* | 9/2004 | Chang | | G01S 5/0027 455/456.1 |
| 2004/0203566 A1* | 10/2004 | Leung | | G01S 1/68 455/404.1 |
| 2005/0003797 A1* | 1/2005 | Baldwin | | H04W 76/007 455/404.1 |
| 2005/0014482 A1* | 1/2005 | Holland | | G01S 5/0027 455/404.1 |
| 2005/0099333 A1* | 5/2005 | Gila | | G01S 13/348 342/118 |
| 2005/0130670 A1* | 6/2005 | Gould | | B60R 25/00 455/456.1 |
| 2006/0293023 A1* | 12/2006 | Levitan | | G01S 5/06 455/404.2 |
| 2007/0030156 A1* | 2/2007 | Schlager | | A61N 1/08 340/573.1 |
| 2007/0037587 A1* | 2/2007 | Mohi | | G01C 21/20 455/456.5 |
| 2007/0037588 A1* | 2/2007 | Mohi | | G01C 21/20 455/456.5 |
| 2008/0125078 A1* | 5/2008 | Morimoto | | G01S 5/0018 455/404.2 |
| 2008/0157970 A1* | 7/2008 | Single | | G01S 5/0263 340/572.1 |
| 2008/0299939 A1* | 12/2008 | Apodaca | | H04M 1/72536 455/404.2 |
| 2009/0303005 A1* | 12/2009 | Tuttle | | H04Q 9/00 340/10.1 |
| 2010/0311358 A1* | 12/2010 | Nogami | | H04B 7/0671 455/101 |
| 2012/0196616 A1* | 8/2012 | Edge | | G01S 5/0036 455/456.1 |
| 2012/0208491 A1* | 8/2012 | Imming | | G01S 5/0027 455/404.2 |
| 2014/0302869 A1* | 10/2014 | Rosenbaum | | H04W 4/026 455/456.1 |

* cited by examiner

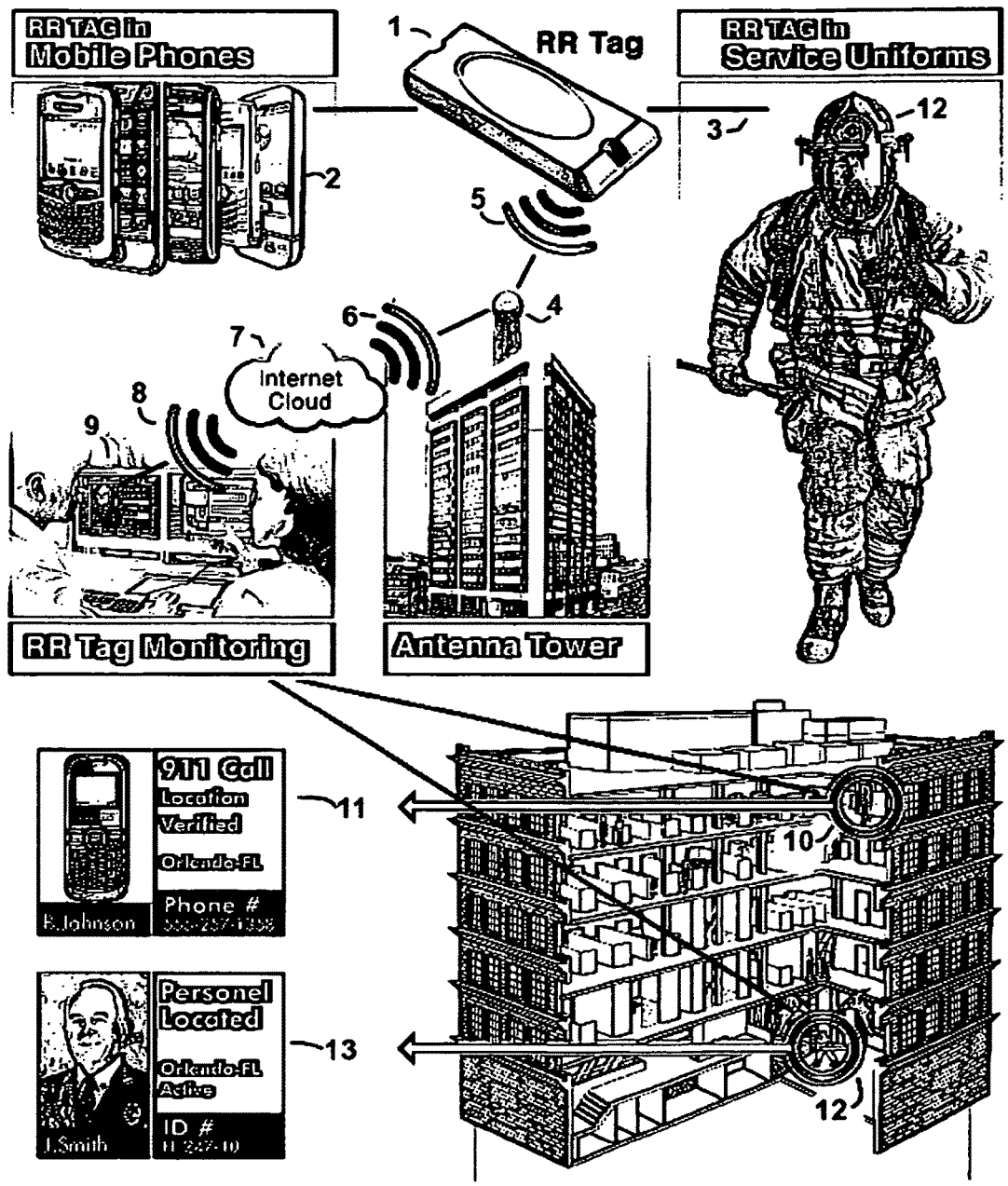

DETAILED DESCRIPTION

TECHNICAL FIELD

This disclosure relates to a user application for a device that interfaces with a clearinghouse, where the clearinghouse integrates geospatial information including date and time information related to radar responsive tags.

BACKGROUND OF THE INVENTION

The FCC implemented E-911 (Enhanced 911) for the cellular phone industry. The wireless Enhanced 911 (E911) rules seek to improve the effectiveness and reliability of wireless 911 service by providing 911 dispatchers with additional information on wireless 911 calls. The wireless E911 program is divided into two parts—Phase I and Phase II. Phase I requires carriers, upon appropriate request by a local Public Safety Answering Point (PSAP), to report the telephone number of a wireless 911 caller and the location of the antenna that received the call. Phase II requires wireless carriers to provide far more precise location information, within 50 to 100 meters in most cases. The deployment of E911 requires the development of new technologies and upgrades to local 911 PSAPs, as well as coordination among public safety agencies, wireless carriers, technology vendors, equipment manufacturers, and local wireline carriers. The FCC established a four-year rollout schedule for Phase II, beginning Oct. 1, 2001 and to be completed by Dec. 31, 2005.

The Phase I requirements were met by blending cellular triangulation and GPS receivers in cellular phones. The Phase II requirements have yet to be met due to the limitations of cellular triangulation and GPS performance inside reinforced buildings and in terrains that degrade or deny cellular and GPS signals.

The need to locate people placing an E-911 call both outdoors and indoors and the need to locate workers in hazardous environments such as first responders, hazardous material industries and offshore workers.

The FCC, realizing the need to also locate first responders as well as consumers placing E-911 calls, on Dec. 21, 2010 released "FCC TAKES FIRST STEP TO HELP REVOLUTIONIZE AMERICA'S 9-1-1 SERVICES FOR CONSUMERS, FIRST RESPONDERS"

Recent offshore operations accidents also reveal the need to know where workers in hazardous work environments are located before, during and after an incident.

The ideal solution is to be able to report the location, date and time of the cell phone making the E-911 phone call in real time, indoors and outdoors and to locate workers in hazardous environments in real time to an accuracy where they can be rescued or directed away from hazards.

SUMMARY

The requirements for E-911 Phase II, originally scheduled for implementation in 2006, have yet to be net for urban environments, inside reinforced structures and geologically challenging terrain.

Similar problems exist for locating an E-911 customer, first responders and workers in certain hazardous environments such as offshore oil exploration and production. Reinforced structures attenuate GPS and cellular signals and introduce signal reflections that either deny or distort the ability to perform Doppler processing and signal strength processing to determine the location of E-911 customers, first responders and workers in environments where there is a metal reinforcement such as reinforced buildings an offshore oil platforms. Radar signals, especially in the 300 MHz to 500 MHz spectrum are well suited for ground and reinforced structure penetration. Multiple antennas can also provide a height component for locating radar responsive tags in three dimensions, such as which floor of a building the tag is located on in a multiple floor building. Building floor plans can also be incorporated as a layer on GIS systems to display floor plan details such as rooms, stairways and elevators.

A radio frequency technology such as microwave or radar that has higher signal strength and can penetrate metal reinforced structures is required that can accurately perform location of a tagging device inside reinforced structures and work outdoors in challenging signal denial and reflection environments such as urban canyons caused by tall structures and geological terrain such as mountains and canyons.

Current ubiquitous monitoring and tracking technology relies on expensive and power consuming devices such as centralized cellular phone tower network triangulation with poor location accuracy and/or decentralized GPS receivers which have poor or no performance indoors. Both solutions are expensive and require battery recharges daily when in use. The high cost of wireless communications to a central system to monitor location in real time is both power and cost prohibitive. In addition the poor location accuracy of cellular tower network triangulation and weak building penetration capabilities of GPS receivers are problematic over large areas.

What is needed is a system that performs as a heart beat monitor of all tracking devices in real time. A system that can detect when a tracking device is tampered with and when its heartbeat drops from the monitoring grid. Such devices must either have extremely long battery life or require little or no power to be effective over the long term and be tamper resistant. This places the responsibility of power at a centralized network, high enough power to minimize the power required in the tracking device. The higher the radiated power of the central network, the lower the power required by the device to return a fraction of the signal exciting the tracking device. Network and device antenna gain is also a key factor.

In addition the tracking device must be small, rugged and waterproof in order to be attached or integrated into a cell phone for E-911 locating or placed on or in garments worn by workers in hazardous environments.

A central monitoring system with distributed nodes for alerts and warnings will also be required that can visualize the location of the customer making the E-911 call, first responders and workers in hazardous environments.

The present invention allows the collection of geospatial location information of cell phones and uniforms fitted with a device including device status, date and time information The present invention further provides a device with long life continuous operation with minimal power consumption. The present invention does not require a separate wireless communications means such as cellular or WiFi to communicate location, status, time and date with a central system clearinghouse or distributed central system.

The result of the current inability to monitor and track the location of consumers making E-911 cell phone calls, first responders and hazardous work scenarios combine to result man increased risk to public safety.

The present invention provides many advantages over the limitations of the status quo addressed above. These advantages include data fusion for increased public and worker safety.

Additionally the clearinghouse utilizes a heretofore unavailable method to obtain the date stamped and time stamped geospatial location and status data.

In some embodiments the device sends data stamped and time stamped geospatial location and status directly to the central system clearinghouse.

In some embodiments the device sends data stamped and time stamped geospatial location and status indirectly to the central system clearinghouse via the distributed central system.

In some embodiments, the device uses a small power battery to amplify the signal fraction returned by the device.

In some embodiments, the device requires no additional power from a battery for the signal fraction returned by the device.

In some embodiments existing radars for air traffic control and weather can be used.

In some embodiments smaller portable and tower mounted radars can be used.

In some embodiments smaller radars can be configured as a perimeter to detect radar responsive tags both inside and outside a perimeter.

In some embodiments smaller radars can be configured as concatenated layers and concentric circles to increase the area to detect radar responsive tags.

In some embodiments smaller radars can be portable or mounted to land, sea and air vehicles.

In some embodiments multiple radars can be used to determine elevation for three dimensional location capability.

While various features are summarized above, the features are designed to be combined with each other in any technically feasible way to create a variety of embodiments of the present invention.

BRIEF DESCRIPTION OF DRAWINGS

For a more complete understanding of the present disclosure and its advantages, reference is now made to the following description, taken in conjunction with the accompanying drawings, in which:

FIG. 1 is a diagram illustrating an exemplary end to end system, including reporting devices, a central system clearinghouse interfaced to monitoring and data collection systems, and users of the data produced by the device and the central system clearinghouse.

DETAILED DESCRIPTION

FIG. 1 depicts an exemplary end to end system including the radar responsive tag tracking device 1 using a fixed location radar antenna 4. This FIGURE depicts the use of a single radar antenna 4 for two dimensional location capability derived from azimuth and range signal returns from the radar responsive tag 1. When the location of the radar antenna 4 is known in latitude and longitude, the latitude and longitude of the radar responsive tags can also be computed based on the azimuth and range information of the radar responsive tag. The central system clearinghouse 9 can interface with the supervising agency personnel using a Geospatial Information System (GIS) as known in the art. A GIS positions an objects geospatial information (i.e. latitude, longitude, date and time) on graphic layers such as maps and aerial photographs or satellite imagery.

In the illustrated embodiment, the central system clearinghouse 9 can also be a distributed central system comprising a mesh or hierarchy of central systems for the purpose of information sharing. The central system can also be implemented as mobile systems such as a mobile command center for first responders or on a ship for offshore exploration and production. An example is a cellular customer 10 that places an E-911 cell phone call for a building fire and the central system or a system at the fire department coordinating a rescue by knowing the location of a first responder 12 by using radar responsive tags 1 in the first responder uniform 12 and the location of the caller by using the radar responsive tag in the cellular customer's 10 cell phone 2.

The radar responsive tag 1 can either be passive (no internal battery) or active (internal battery). Active radar responsive tag 1 would implement motion sensing and timers for active periods in order to implement power management to extend battery life.

The radar responsive tag, as known in the art, is a resonator that is tuned to the frequency of the radar antenna 4. As the radar antennae 4 azimuth sweep signal 5 strikes the radar responsive tag 1 providing an azimuth, the radar responsive tag 1 responds and returns a fraction of the original radar antenna signal 5 to the radar antennae 4 and the range or distance between the radar responsive tag 1 and the known location of the antenna 4 is calculated based on TDOA (Time Distance Of Arrival) also known in the art as the Doppler effect. The combination of the azimuth and the range locate the tag relative to the radar antenna 4.

In the embodiment of FIG. 1, the radar can be a primary search radar used for air traffic control which can emit 10 megawatts of radiated power or a smaller lower power tower mounted radar. Primary search radars are typically located at major airports domestically and internationally and overlap to provide coverage ranging from 250 to 500 miles. Such a strong signal coupled with a high gain radar antenna 4 gain would permit the use of passive radar responsive tags. Secondary search radars will typically be in the hundreds of kilowatts to serve as gap fillers in smaller regional airports. Mobile tactical radars are typically in this power range as well. Portable radars are in the 10 to 50 watt power range. In addition, weather radars have a radiated power in the range of tens to hundreds of kilowatts. These radiated energy levels make is possible to excite a radar responsive tag 1 over tens to hundreds of miles and provide location and elevation accuracy to within meters outdoors and indoors. For example, considering that cell tower antennas radiate at 200 watts and can penetrate buildings over a range of several miles and cell phones can respond with a radiated power of only 0.5 watts.

The existing high power radar network covering the entire United States can immediately be leveraged and can be augmented with smaller tower mounted antennas which can address coverage for urban areas, suburban areas, remote areas and terrain driven radar coverage outage areas such as mountains and canyons.

Another embodiment would be to deploy a mesh of lower power radar antennas 4 on existing cellular towers working at distances to tens of miles using portable radar antennas and mobile radar antennas tuned to an optimum frequency for reducing ground clutter, reducing weather interference and optimizing building penetration. A mesh radar antenna 4 topology would also yield a more uniform coverage and improved location accuracy based on triangulation techniques as known in the art. Radar antennas 4 can also be mounted on mobile land, sea and air vehicles.

The radar antennas 4 digital signal processor, as known in the art, converts the analog radar signals to digital information and is physically connected 6 to the Internet 7. The distributed central system and/or central system clearinghouse 9 is also physically connected 8 to the Internet 7 and can receive time and date stamped geospatial location data and radar responsive tag 1 status radiated by the radar responsive tags 1 and received by the radar antenna 4.

Each radar responsive tag 1 can modulate a unique identifier that is returned 6 to the radar antenna 4. When the radar responsive tag 1 is attached to a cell phone 2 or a uniform 3, then the unique identifier can be associated with a unique serial number for the cell phone 11 and uniform 13 and reported to the E-911 PSAP (Public Service Access Point).

With each azimuth sweep of the radar antenna 4 the passive or active radar responsive tag 1 modulates its unique identifier and the current status of the radar responsive tag 1 and returns the signal with information to the radar antenna 4. Active radar responsive tags 1 would be active during motion of the cell phone or uniform or at timed intervals during non motion to conserve battery life. Such status could be battery level if the radar responsive tag 1 is an active radar responsive tag 4. Battery assisted passive and passive radar responsive tags 1 use the energy received from the radar antenna 4 signal to turn on the electronics inside the radar responsive tag 1. This continuous return signal 5 from the passive radar responsive tag 1 or the time interval response from the active radar responsive tag 1 provides the essential heartbeat signal from the radar responsive tag 1 so that the status (i.e. operating, not operating, removed, damaged, battery level etc.) of the radar responsive tag 1 is continuously known by the central system 9.

When the radar responsive tag 1 is removed, damaged, non operational or battery is low, its status will be displayed on the central system 9.

Direct connections to clearinghouse 9 can be provided for monitoring at agencies and for first responder notification. Any of the entities above may also be connected to clearinghouse 9 via the internet 7. For example, fire departments could coordinate the rescue of an E-911 caller 10 inside a building by a firefighter 12.

Any appropriate connection method or protocol for any of the entities or individuals mentioned above may be used in accordance with the scope of the present disclosure.

What is claimed is:

1. A system for implementing an E-911 call comprising:
   One or more stationary or mobile radar units, wherein the one or more stationary or mobile radar units comprises a radar transmitter and a radar receiver of one or more radar types, the transmitter and receiver of a radar unit being the same radar type
   One or more radar responsive tags, the one or more radar responsive tags comprising one or more radar responsive tag types
   Wherein the radar transmitter is configured to transmit a modulated interrogation signal comprising commands and data related to the commands
   Wherein the radar responsive tag is configured to receive the modulated interrogation signal and transmit a response to the receiver of the radar unit when the radar responsive tag is commanded to respond by the modulated interrogation signal
   Wherein the response includes geospatial location data and radar responsive tag status information
   Wherein the radar responsive tag is connected to one or more of a cellular network, the Internet, or a local area network (LAN)
   Wherein the radar unit is configured to communicate radar responsive tag geospatial location data and radar responsive tag status information to a central system
   Wherein the central system is configured to provide the radar responsive tag geospatial location data and radar responsive tag status information to a public service access point (PSAP) router
   Wherein the PSAP router is configured to determine a PSAP, from a list of one or more PSAPs, for responding to an E-911 call made by the radar responsive tag based upon the radar responsive tag geospatial location data and the radar responsive tag status information
   Wherein the PSAP router is configured to communicate the radar responsive tag geospatial location data and radar responsive tag status information to the determined PSAP for responding to the E-911 call.

2. The system of claim 1, wherein the radar transmitter and radar receiver are multi-static.

3. The system of claim 1, wherein the radar types comprise one or more of bi-static, continuous wave, Doppler, mono-pulse, pulse Doppler, and synthetic aperture.

4. The system of claim 1, wherein the one or more radar units are configured to locate the radar responsive tag in 3-axis.

5. The system of claim 1, wherein the radar responsive tag is configured to interface with a cellular phone.

6. The system of claim 5, wherein the radar responsive tag is configured to connect to the Internet via the cellular phone.

7. The system of claim 5, wherein the radar responsive tag is configured to connect to the Local Area Network via the cellular phone.

8. The system of claim 1, wherein the central system is geographically distributed.

9. The system of claim 1, wherein the central system comprises a display for displaying the location of the radar responsive tag.

10. The system of claim 1, wherein the central system is connected to the Internet.

11. The system of claim 10, wherein the radar responsive tag is configured to connect to the Internet via the central system.

12. A method for implementing an E-911 call from a radar responsive tag to a public service access point (PSAP) comprising the steps of:
   Transmitting from one or more stationary or mobile radar units, a modulated interrogation signal comprising commands and data related to the commands
   Wherein the radar unit comprises a transmitter and a receiver of one or more radar types, the transmitter, and receiver of a radar unit being the same radar type
   Receiving, at the radar responsive tag, the modulated interrogation signal
   Transmitting, from the radar responsive tag, a response to the receiver of the radar unit when the radar responsive tag is commanded to respond by the modulated interrogation signal,
   Wherein the response includes geospatial location data and radar responsive tag status information
   Wherein the radar responsive tag is connected to one or more of a cellular network, the Internet, or a local area network (LAN)

Communicating, by the radar unit, radar responsive tag geospatial location data and radar responsive lag status information to a central database Providing, by the central database, the radar responsive tag geospatial location data and radar responsive tag status information to a public service access point (PSAP) router Determining, by the PSAP router, a PSAP, from a list of one or more PSAPs, for responding to an E-911 call made by the radar responsive tag based upon the radar responsive tag geospatial location data and the radar responsive tag status information Communicating the radar responsive tag geospatial location data and radar responsive tag status information to the determined PSAP for responding to the E-911 call.

13. The method of claim 12, wherein the radar responsive tag is connected to a cellular phone.

14. The method of claim 12, wherein the one or more stationary or mobile radar units interface with the Internet.

15. The method of claim 13, wherein the radar responsive tag connects to the Internet via a cellular phone.

16. The method of claim 13, wherein the radar responsive tag connects to a local area network (LAN) via a cellular phone.

17. The method of claim 12, wherein the radar responsive tag implements the E-911 call via a cellular phone with no power.

18. The method of claim 12, wherein the radar responsive tag implements the E-911 call via a cellular phone with no cellular signal.

* * * * *

UNITED STATES PATENT AND TRADEMARK OFFICE
CERTIFICATE OF CORRECTION

PATENT NO.         : 10,082,568 B1
APPLICATION NO.    : 13/999141
DATED              : September 25, 2018
INVENTOR(S)        : Layson, Jr.

It is certified that error appears in the above-identified patent and that said Letters Patent is hereby corrected as shown below:

On the Title Page

Item (54) and in the Specification, Column 1, Line 1, should read, E-911 System and Method Based on Full Duplex System of Radar Transmitters, Radar Receivers, and Programmable Radar Responsive Tags Signed and Sealed this
Third Day of September, 2019

Andrei Iancu
*Director of the United States Patent and Trademark Office*